United States Patent [19]
Weinfurtner et al.

[11] Patent Number: 5,684,391
[45] Date of Patent: Nov. 4, 1997

[54] CIRCUIT ARRANGEMENT FOR POWERING AT LEAST ONE LOAD

[75] Inventors: Günter Weinfurtner, Wendelstein; Werner Jungreitmeier, Modautal, both of Germany

[73] Assignee: U.S. Philips Corporation, New York, N.Y.

[21] Appl. No.: 530,815

[22] Filed: Sep. 20, 1995

[30] Foreign Application Priority Data

Sep. 24, 1994 [DE] Germany .................. 44 34 185.7

[51] Int. Cl.[6] ............................................. G05F 1/56
[52] U.S. Cl. ............................................. 323/282
[58] Field of Search ........................... 323/282, 284, 323/349, 351; 307/24, 29, 38, 39; 363/21, 23, 25

[56] References Cited

U.S. PATENT DOCUMENTS

| | | | |
|---|---|---|---|
| 4,626,767 | 12/1986 | Clappier et al. | 323/280 |
| 4,641,042 | 2/1987 | Miyazawa | 307/66 |
| 4,788,455 | 11/1988 | Mori et al. | 323/314 |
| 5,161,097 | 11/1992 | Ikeda | 363/124 |

*Primary Examiner*—Matthew V. Nguyen
*Attorney, Agent, or Firm*—Leroy Eason

[57] ABSTRACT

A voltage control system for powering at least one remote load from a local power supply. A voltage control circuit coupled to the power supply produces a supply voltage which is transmitted to the load and is selectively set to any of a plurality of levels. A comparator at the load supplies back to the voltage control circuit an identification signal of a given type when the supply voltage is below a reference voltage level which can safely be applied to the load. The identification signal causes the voltage control circuit to change the supply voltage to a value which exceeds the reference voltage level but does not subject the load to overvoltage.

5 Claims, 2 Drawing Sheets

CIRCUIT ARRANGEMENT FOR POWERING AT LEAST ONE LOAD

BACKGROUND OF THE INVENTION

The invention relates to a circuit arrangement for powering at least one load by a supply voltage source.

Particularly in telecommunication technology it occurs that telecommunication devices, in particular when situated outside exchanges and the like, are supplied with electric power from a remote location. For this remote power supply the signal transmission lines, i.e. communication lines, which are available anyway may be used but it is also possible to use additional lines.

In the case of such a remote power supply a plurality of communication or signal-transmission devices may be connected as loads to a supply voltage source, provided for example in a telecommunications office, via suitable lines. Since in such systems there is no longer any direct spatial relation special care must be taken that the supply voltage source and the loads to be powered are adapted to one another as regards the power to be supplied and to be received in order to preclude damage or incorrect operation. However, from the location of the power supply source it is still possible, as a rule, to detect and remedy, in particular an overload of the supply voltage source but also an inadequate power supply to the loads.

However, if remote-powered signal transmission devices are used as loads which are powered with supply voltages of different values, defects which cannot be detected and, in particular, cannot be predicted may occur in these loads when they are powered with too high a supply voltage.

SUMMARY OF THE INVENTION

It is an object of the invention to construct a circuit arrangement for the power supply of at least one load by means of one supply voltage source so as to preclude damage to the loads as a result of excessive supply voltages, for example as described above.

According to the invention this object is achieved by a circuit arrangement for powering at least one load by a supply voltage source which is adapted to produce a supply voltage which can be set selectively to a supply voltage value lower than a reference voltage and to at least one further supply voltage value higher than the reference voltage, the load(s) being adapted to supply an identification signal (or identification signals) of a given type upon receipt of a supply voltage lower than the reference voltage, by which identification signal(s) the supply voltage source can be switched to a given one of the supply voltage values which are higher than the reference voltage.

The invention effectively prevents excessive supply voltages from reaching loads having a lower voltage rating. The supply voltage source is then not set to a supply voltage value higher than the reference voltage until it has been established that the appropriate terminal devices, i.e. signal processing devices which are suitable as regards their rated supply voltage, are connected. As a result of this, the operation of such circuit arrangements, particularly putting into operation after modifications, as occur very frequently in particular in a telecommunication network, is simplified considerably and, moreover, the protection against damage is improved significantly. In addition, it prevents the subscriber from being directly exposed to hazardous voltages in the event of an incorrect connection.

In the circuit arrangement in accordance with the invention, by preference, switching to a supply voltage value higher than the reference voltage is not effected if the supply voltage source does not receive an identification signal of the given type. The supply voltage which is initially supplied when, for example, the supply voltage source is turned on again, which supply voltage has a value smaller than that of the reference voltage and can be applied to all the signal transmission devices connectible as loads without causing damage to these devices, is then not increased any further and remains below the reference voltage. If desired, the supply voltage source may also supply an error signal.

On the other hand, the loads, i.e. the signal transmission devices forming these loads, comprise means for supplying the identification signals, which means in contrast with the other parts of the loads or signal transmission devices are already operative at a supply voltage smaller than the reference voltage and which, in order to save electric energy or to provide overvoltage protection, can preferably be disconnected from the supply voltage source if the supply voltage assumes a value in excess of the reference voltage.

In the simplest case the identification signals may merely provide information about whether the value of the supply voltage of the supply voltage source may be increased. However, it is also advantageous to transmit identification signals providing information about the nature, particularly the voltage rating, of the load which transmits the identification signals. Such identification signals for example enable the supply voltage source to be set selectively to a permissible supply voltage value.

In a modification of the circuit arrangement in accordance with the invention the identification signals comprise waveforms having a different given frequency for each of the supply voltage values above the reference voltage. The supply voltage source is then controlled by the identification signals basically by a simple frequency selection of the received identification signals.

In another modification the signals comprise digital pulse signals which are coded differently for each of the supply voltage values above the reference voltage. This allows digital control of the supply voltage source. Such identification signals are advisable in particular if they should transmit a large mount of information, for example also about particulars of the transmitting load and, if desired, its location.

Further embodiments of the invention are defined in the subsidiary claims.

BRIEF DESCRIPTION OF THE DRAWINGS

Two preferred embodiments of the invention are shown in the drawings and will be described in more detail hereinafter. In the drawings.

In the drawings like elements bear the same reference symbols.

DESCRIPTION OF THE PREFERRED EMBODIMENTS

Figure 1:
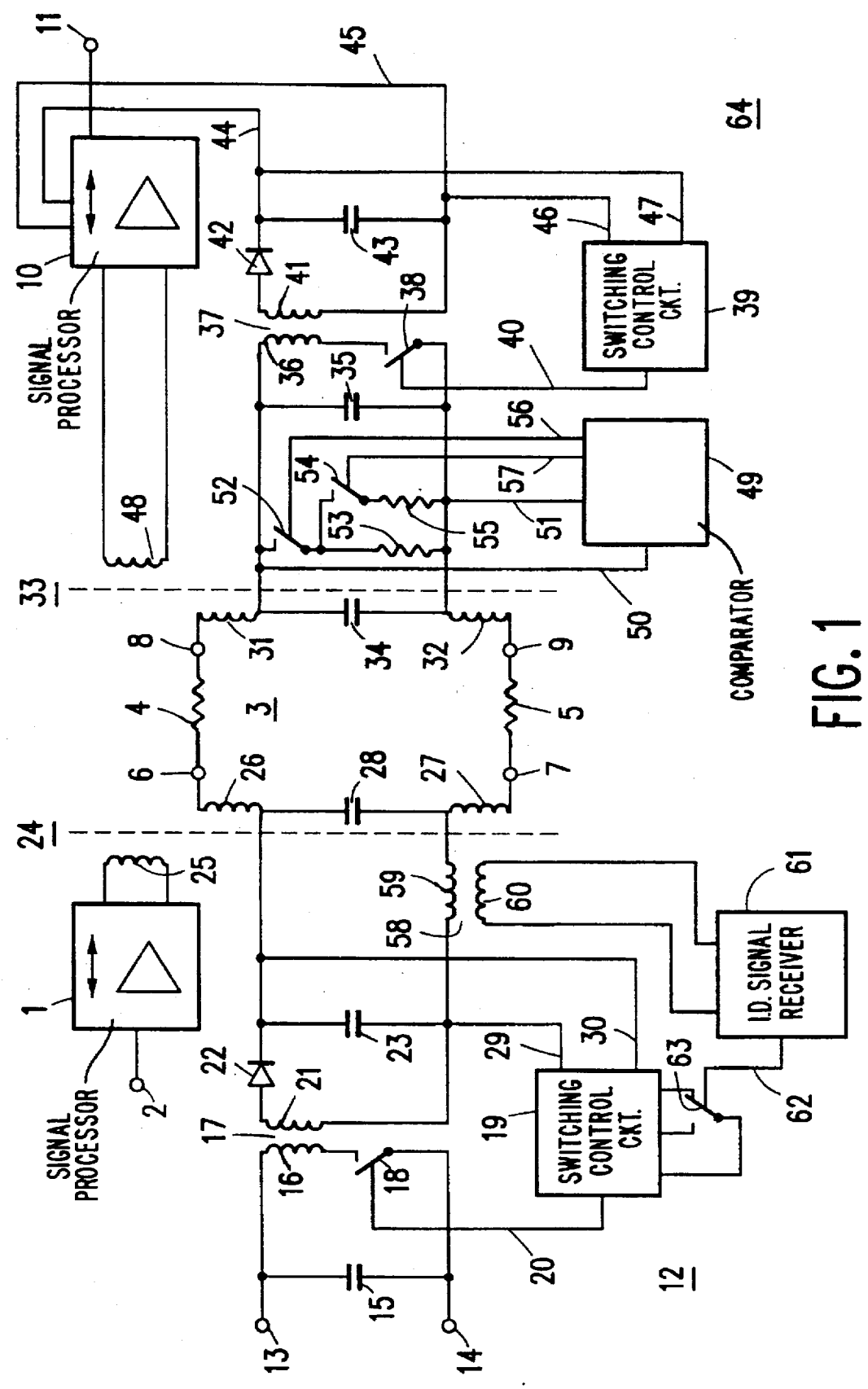
FIG. 1 is a block diagram of a first embodiment of the invention.

In the first embodiment shown in FIG. 1 a first signal processing device 1 serves for example for signal transmission in a telecommunication system between a terminal 2 and a communication line 3. In FIG. 1 the communication line 3 is shown symbolically by two resistors 4, 5 representing an equivalent diagram for the actual line impedances of the communication line 3 and ganged between line terminals 6, 7 and 8, 9, respectively. The line terminals 6, 7 form that end of the communication line 3 which faces the first signal processing device 1. The first signal processing device 1 is arranged in, for example, a telecommunication exchange, from which at least one further signal processing device 10 is to be supplied with electric power. This further signal processing device 10, for example another telecommunication device, is connected to a second line end formed by the line terminals 8, 9 and has a terminal 11. During operation of this circuit arrangement it should be possible to transmit telecommunication signals from the terminal 2 to the terminal 11 and vice versa, the entire circuit arrangement being supplied with electric power exclusively from the location of the first signal processing device 1.

At the location of the first signal processing device 1 a supply voltage source 12 is available for the remote power supply of the further signal processing device 10, which source can be supplied with electric power, for example from a power supply mains, via two mains terminals 13, 14. In the example shown in FIG. 1 the supply voltage source 12 is constructed as a switched-mode power supply for generating a supply voltage from a (preferably rectified) mains voltage applied via the mains terminals 13, 14. In a modification it is also possible to apply power from, for example, a central battery or the like via the mains terminals 13, 14. The switched-mode power supply of the supply voltage source 12 comprises a first smoothing capacitor 15 arranged between the mains terminals 13, 14 and, arranged in parallel therewith, a series arrangement of a primary winding 16 of a first switched-mode-power-supply transformer 17 and a first chopper switch 18. For simplicity the first chopper switch 18 is shown as a mechanical switch in FIG. 1 but it practice it is preferably implemented as an electronic switch. By means of a control circuit 19 it is alternately switched to an on-state and an off-state, for which purpose there is provided a control line 20.

An alternating voltage taken from a secondary winding 21 of the first switched-mode-power-supply transformer is applied to a series arrangement of a first diode 22 and a second smoothing capacitor 23. The supply voltage is then taken from the terminals of the second smoothing capacitor 23 and applied to the line terminals 6 and 7 of the first line end connected to the first signal processing device 1. For the transmission of telecommunication signals between the first signal processing device 1 and the line terminals 6, 7 and for the transmission of electric power from the terminals of the second smoothing capacitor 23 to the line ends 6, 7 there is provided a first line transformer 24 having a primary winding 25 and a secondary winding divided into two sections 26, 27. The first and the second section 26, 27 of the secondary winding of the first line transformer 24 each have one terminal connected to the respective line terminal 6 or 7, the other terminals of the first and the second section 26, 27 of the secondary winding of the first line transformer 24 being connected each to one of the terminals of the second smoothing capacitor 23 and, moreover, to one another via a first coupling capacitor 28. The first coupling capacitor 28 forms an a.c. short-circuit for the signals to be transmitted from the telecommunication line 3 to the first signal processing device 1 and vice versa.

The terminals of the second smoothing capacitor 23 are also connected to two inputs 29, 30 of the control circuit 19. Power supply to the control circuit 19 is provided via these inputs 29, 30 and, in addition, the voltage applied via the inputs 29, 30 is used as a control parameter for the generation of a control signal applied to the first chopper switch 18 via the control line 20. Preferably, the control circuit 19 comprises a pulse-width modulator which supplies a control signal in the form of a pulse-width-modulated pulse signal to the first chopper switch 18 via the control line 20, which signal controls this chopper switch in such a manner that the supply voltage across the second smoothing capacitor 23 is at least substantially load-independent.

The signal processing device 10 at the second line end formed by the line terminals 8, 9 is also supplied with power by means of a switched-mode power supply, which is powered by the supply voltage source 12 via the telecommunication line 3. For this purpose the line terminals 8, 9 at the second line end are shunted by a series arrangement of two sections 31, 32 of a secondary winding of a second line transformer 33 and a second coupling capacitor 34. From the terminals of the second coupling capacitor 34, which again forms a short-circuit for the telecommunication signals to be transmitted between the signal processing devices 1 and 10, the supply voltage, attenuated by the voltage losses in the telecommunication line 3 and the secondary windings 26, 27 and 31, 32 of the line transformers 24 and 33, respectively, is taken from the supply voltage source and applied to the switched-mode power supply for powering the signal processing device 10. This device includes a third smoothing capacitor 35, which is arranged in parallel with the second coupling capacitor 34 and which is again arranged in parallel with a series arrangement of a primary winding 36 of a second switched-mode-power-supply transformer 37 and a second chopper switch 38. The second chopper switch 38 is alternately set to the on-state and the off-state by a second control circuit 39 via a second control line 40. A series arrangement of a second diode 42 and a fourth smoothing capacitor 43 is connected to the terminals of a secondary winding 41 of the second switched-mode-power-supply transformer 37. The supply voltage for the signal processing device 10 is taken from the terminals of the fourth smoothing capacitor 43 via power-supply terminals 44, 45.

The terminals of the fourth smoothing capacitor 43 are further connected to inputs 46 and 47 of the second control circuit 39, via which the voltage across the fourth smoothing capacitor 43 can be applied as a supply voltage and at the same time as a voltage measurement indicator.

The operation of the switched-mode power supply formed by elements 35 to 43 corresponds to that of the switched-mode power supply formed by elements 15 to 23 in the remote supply voltage source 12.

The second line transformer 33 has a primary winding 48 which is magnetically coupled to the secondary winding 31, 32 in the same way as the primary winding 25 of the first line transformer 24 is magnetically coupled to the secondary winding 26, 27. The terminals of the primary winding 48 of the second line transformer are connected to the further signal processing device 10 in a manner corresponding to the connection of the terminals of the primary winding 25 of the first line transformer 24 are connected to the first signal processing device 1. In this embodiment coupling in and out of telecommunication signals from the signal processing devices 1 and 10 to the telecommunication line 3 is preferably effected symmetrically in order to obtain the same transmission conditions in both signal processing devices.

In order to generate an identification signal the circuit arrangement has at the second line end 8, 9, i.e. in conjunction with the remote-powered switched-mode power supply formed by elements 35 to 43, a device for generating an identification signal having a given frequency and which is supplied if the supply voltage across the coupling capacitor 34, applied via the second line end 8, 9, is smaller than a given reference voltage. Said device comprises a comparator stage 49 having two inputs 50, 51 arranged in parallel with the second coupling capacitor 34 and with the third smoothing capacitor 35, respectively. The comparator stage 49 is constructed in such a manner that it is already operative at a supply voltage value which is smaller than the reference voltage and to which the supply voltage source 12 can be set, regardless of whether the remote-powered switched-mode power supply formed by elements 35 to 43 or the signal processing device 10 powered thereby can already operate at this supply voltage value. The supply voltage applied via the inputs 50, 51 of the comparator stage 49 provides the electrical power supply for this stage and is also used for the comparison with the given reference voltage, which is preferably generated within the comparator stage 49. In order to prevent a reference voltage higher than said low supply voltage value from being generated said comparison can, for example, also be effected between a given fraction of this reference voltage and the same fraction of the applied supply voltage, or use can be made of threshold circuits dimensioned for the reference voltage.

A series arrangement of a first switch 52 and a first resistor 53 is arranged in parallel with the second coupling capacitor, which first resistor is shunted by a series arrangement of a second switch 54 and a second resistor 55. The comparator stage 49 has a first control output 56 and a second control output 57, which are connected to the first switch 52 and the second switch 54, respectively. The comparator stage 49 sets the first switch 52 to the on-state via the first control output 56 if the supply voltage at the inputs 50, 51 of the comparator stage 49 is smaller than the reference voltage, and sets the first switch 52 to its off-state if the supply voltage at the inputs 50, 51 exceeds the reference voltage. The comparator stage 49 produces at its second control output 57 a switching signal having the frequency of the identification signal, which switching signal sets the second switch 54 alternately to the on-state and to the off-state. Thus, when the first switch 52 is in the on-state an identification signal is applied from the comparator stage 49 to the second line end 8, 9 via the second switch 54 and to the first line end 6, 7 via the telecommunication line 3. For supply voltage values exceeding the reference voltage this identification signal is interrupted by the first switch 52.

To receive and process this identification signal the supply voltage source 12 further comprises an identification-signal transformer 58 whose primary winding 59 has one of its terminals connected to the node between the first coupling capacitor and the second section 27 of the secondary winding of the first line transformer 24 and has a second terminal connected to the node between the second smoothing capacitor 23, the secondary winding 21 of the first switched-mode-power-supply transformer 17 and the input 29 of the first control circuit 19. As a result, the primary winding 59 of the identification-signal transformer 58 is situated in the path of the supply current produced by the supply voltage from the supply voltage source 12 but not in the signal path for the telecommunication signals between the signal processing devices 1 and 10, respectively. Preferably, the frequency of the identification signal is selected to be lower than the frequencies of the telecommunication signal, so that, in contradistinction to the telecommunication signal, the identification signal is not short-circuited by the coupling capacitors 28, 34.

A secondary winding 60 of the identification-signal transformer 58 has its terminals connected to an identification-signal receiver 61. Thus, by means of the identification-signal transformer 58 the identification signal is coupled out and applied to the identification-signal receiver 61 for evaluation. When this receiver receives an identification signal, i.e. a waveform of given frequency, a switching signal will appear at a switching output 62 of the identification-signal receiver 61. This switching signal is applied to a change-over switch 63 connected to the switching output 62 and having its switching blade and its change-over contacts connected to the first control circuit 19. When an identification signal is received the switching signal sets the change-over switch 63 from a first switch position to a second switch position. As a result of this, the operation of the first chopper switch 18 in the control circuit 19 is influenced in such a manner that the supply voltage source 12 is set to supply a preselected supply voltage of a value larger than the reference voltage. In the absence of or in the case of an incorrect identification signal the change-over switch 63 remains in the position in which—under control of the first control circuit 19—the supply voltage source 12 only supplies a supply voltage of a value smaller than the reference voltage.

When the circuit arrangement shown in FIG. 1 is put into operation, also after for example an interruption, the supply voltage source 12 will initially supply a supply voltage having a value smaller than the reference voltage. This supply voltage is applied, via the telecommunication line 3, to the switched-mode power supply formed by elements 35 to 43 which powers the further signal processing device 10, and also to the comparator stage 49. The signal processing device 10 may be designed for the supply voltage value assumed in this operating condition, but preferably it is designed for a supply voltage value higher than the reference voltage. In the first-mentioned case the signal processing device 10 can already be fully operative and in the last-mentioned case it will not yet be operative. However, the comparator stage 49 is already operative at the low supply voltage value and, via the second switch 54 and the second resistor 55, it generates the identification signal, which is applied via the first switch 52 in the telecommunication line 3 and thus reaches the identification signal receiver 61 via the identification-signal transformer 58. This receiver now causes the first control circuitry 19 to set the supply voltage source 12 so as to supply a higher supply voltage value. In the case that the further signal processing device 10 is designed only for the lower supply voltage value, the comparator stage 49 will either be dispensed with or will supply no identification signal or an identification signal of a frequency which is not recognised by the identification-signal receiver as an identification signal for raising the supply voltage.

In the exemplary embodiment shown in FIG. 1 the further signal processing device 10, the second line transformer 23, the remote-powered switched-mode power supply formed by elements 35 to 43 as well as the means formed by elements 49 to 57 for generating the identification signal, all constitute a load connected to the second line end 8, 9.

Loads, i.e. signal processing devices, which are to be powered with different supply voltage values can also be distinguished from one another by means of identification signals of different given frequencies. For example, signal processing devices may be classified for supply voltage values of 200 V, 300 V, 400 V, 600 V etc. Each of these classes is then given an identification frequency, i.e. identification signals of given mutually different frequencies. The comparator stage 49 with the resistors 53, 55 and the switches 52, 54, which forms an identification frequency generator, is then connected in circuit by means of the switch 52 for a supply voltage value lower than, for example, the reference voltage of 120 V and is disconnected for supply voltage values above 120 V. If the identification-signal receiver 61 now detects an identification signal of the correct frequency the supply voltage source 12 can be set to its nominal supply voltage above 120 V. However, when the identification signal receiver 61 does not receive an identification signal or an identification signal of another frequency the supply voltage of the supply voltage source 12 will remain smaller than 120 V. Moreover, the identification signal receiver 61 may produce an error message in this case.

Figure 2:
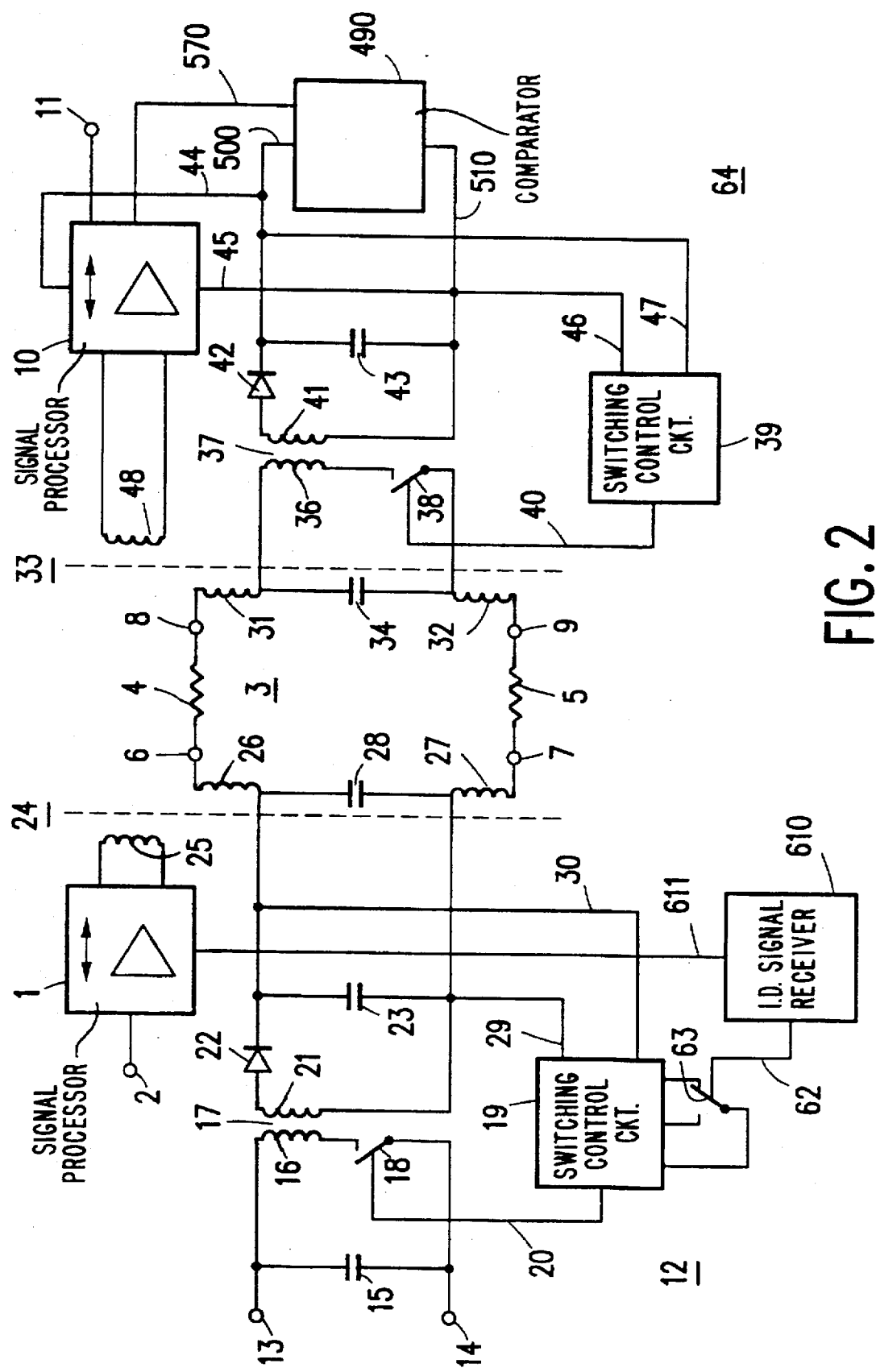
FIG. 2 is a block diagram of a second embodiment of the invention.

In the circuit arrangement in FIG. 2, which shows a second exemplary embodiment of the invention, the elements for signal transmission and processing and for the remote power supply correspond to those in FIG. 1, for which reason they will not be described any further. It is to be noted merely that in the circuit arrangement shown in FIG. 2 the third smoothing capacitor 35 has been dispensed with or combined with the second coupling capacitor 34.

For the generation of identification signals the circuit arrangement shown in FIG. 2 comprises a comparator stage 490 to which the voltage produced across the fourth smoothing capacitor 43 by the remote-powered switched-mode power supply is applied via a first input 500 and a second input 510, which voltage also powers the further signal processing device 10 via the power supply terminals 44, 45. The comparator stage 490, which preferably comprises a microprocessor or another comparable control device, has a control output 570 at which a digitally coded pulse signal can be produced, which signal can be applied to the further signal processing device 10 for transmission via the telecommunication line 3. This digital identification signal contains information about the supply voltage value for which the further signal processing device 10 is dimensioned.

The supply voltage source 12 in FIG. 2 comprises a digital identification signal receiver 610, to which the identification signal, which is received from the signal processing device 1 via the telecommunication line 3, is applied via an identification-signal line 611. Evaluation of the applied identification signal in the digital identification signal receiver 610 yields a switching signal, which is applied to the change-over switch 63 via the switching output 62.

In the embodiment shown in FIG. 2 the remote-powered loads 64, i.e. the further signal processing device 10, the second control circuit 39 and the comparator stage 490 are designed so that they are already operative at a supply voltage value smaller than the reference voltage. It is then adequate if the further signal processing device 10 is not yet fully operational for the transmission of all the telecommunication signals to be transferred by means of the first signal processing device 1 but is merely capable of transferring the identification signal from the comparator stage 490 to the first signal processing device 1 via the telecommunication line 3. When the circuit arrangement shown in FIG. 2 is put into operation, particularly after an interruption, the supply voltage source 12 is again operated in such a manner that it supplies only the low supply voltage value below the reference voltage. This supply voltage starts the remote-powered switched-mode power supply formed by elements 36 to 43 at the second line end 8, 9 and also causes the supply voltage produced by this power supply to be applied to the further signal processing device 10 via the inputs 500, 510 of the comparator stage 490 and via the power supply terminals 44, 45. The comparator stage 490 compares the applied supply voltage with the reference voltage and, if it is smaller than the reference voltage, an identification signal is applied to the further signal processing device 10 via the control output 570, preferably as a digital code word and, if required, periodically recurrent, which signal processing device transfers this identification signal to the first signal processing device 1 via the telecommunication line 3. The first signal processing device transfers the identification signal to the digital identification-signal receiver 610 via the identification-signal line 611. Evaluation of the identification signal in the digital identification-signal receiver 610 indicates whether the supply voltage source 12 may be set to a higher supply voltage value and, if applicable, to which of a plurality of different supply voltage values it is to be set. However, if the further signal processing device 10 is designed only for a low supply voltage value smaller than the reference voltage, this is also indicated via a suitably encoded identification signal or, if desired, by the absence of an identification signal. The supply voltage source 12 is then operated at the low supply voltage value; if necessary, the digital identification-signal receiver 610 may again supply an error signal. This type of identification signal also enables loads dimensioned for different supply voltage values to be detected and thus a correct remote power supply of these loads to be realised without the risk of damage by overvoltage.

We claim:

1. A voltage control system for powering a remote load from a local power supply via a transmission line, said voltage control system comprising:

a voltage control circuit coupled to said power supply for deriving therefrom a load supply voltage which is selectively set to any of a plurality of predetermined values, and transmitting said supply voltage to said load via said transmission line; and comparator means coupled to said load for transmitting back to said voltage control circuit via said transmission line an identification signal of a predetermined type if the voltage supplied to said load is below a predetermined reference level;

said voltage control circuit being responsive to said identification signal to change said supply voltage to a value which at least exceeds said reference level but does not subject the load to overvoltage.

2. A voltage control system as claimed in claim 1, wherein said voltage control circuit maintains said supply voltage at a value below said reference level until said identification signal is provided by said comparator means.

3. A voltage control system as claimed in claim 1, wherein said identification signal has a different frequency for each of a plurality of values of said supply voltage exceeding said reference level.

4. A voltage control system as claimed in claim 1, wherein said identification signal is digital and is differently coded for each of a plurality of values of said supply voltage exceeding said reference level.

5. A voltage control system as claimed in claim 1, wherein said load is a signal processing device and said transmission line is a signal transmission line.

* * * * *